United States Patent [19]

Wozniak

[11] 4,380,173
[45] Apr. 19, 1983

[54] ROLL-UP TYPE U-TUBE MANOMETER

[75] Inventor: David A. Wozniak, Michigan City, Ind.

[73] Assignee: Dwyer Instruments, Inc., Michigan City, Ind.

[21] Appl. No.: 273,215

[22] Filed: Jun. 12, 1981

[51] Int. Cl.³ .............................................. G01L 7/18
[52] U.S. Cl. ...................................... 73/747; 116/323
[58] Field of Search ................. 73/747, 748, 749, 750; 116/322, 323, 324

[56]     References Cited
U.S. PATENT DOCUMENTS

| 646,914 | 4/1900 | Peek | 116/324 |
| 2,662,409 | 12/1953 | Dwyer | 73/747 |
| 3,529,135 | 9/1970 | Rienecker | 116/322 |
| 4,297,889 | 11/1981 | Buchanan et al. | 73/747 |

Primary Examiner—Donald O. Woodiel
Attorney, Agent, or Firm—McWilliams, Mann & Zummer

[57] ABSTRACT

A roll-up type U-tube manometer of the type disclosed in Dwyer U.S. Pat. No. 2,662,409, in which the manometer tubes are defined by a flexible elongate body that may be as long as ten feet or any desired length formed from a transparent flexible plastic material that is shaped to define the basic manometer tubes, the opposing side walls of which are integrally connected in spaced apart relation by a web, in which the body along the front side of same is formed adjacent the juncture of the respective tubes and the web with a pair of continuous flanges at similar flat angles relative to the web to overlie same and define along each tube an apex shaped slot, which slots and the web form a slideway between the tubes in which a scale in the form of a length of spring steel stripping of film thickness dimensions and a length approaching that of said body, that is arched convexly of the front surface of same, is slidably mounted with continuous engagement by the body with the scale along the scale side edges to uniformly hold the scale in its slideway along its length, wherein the scale has fixed to same adjacent the scale zero markers a finger hold knob for manual zero setting of the scale without having to reach for one end of the scale to shift same.

5 Claims, 6 Drawing Figures

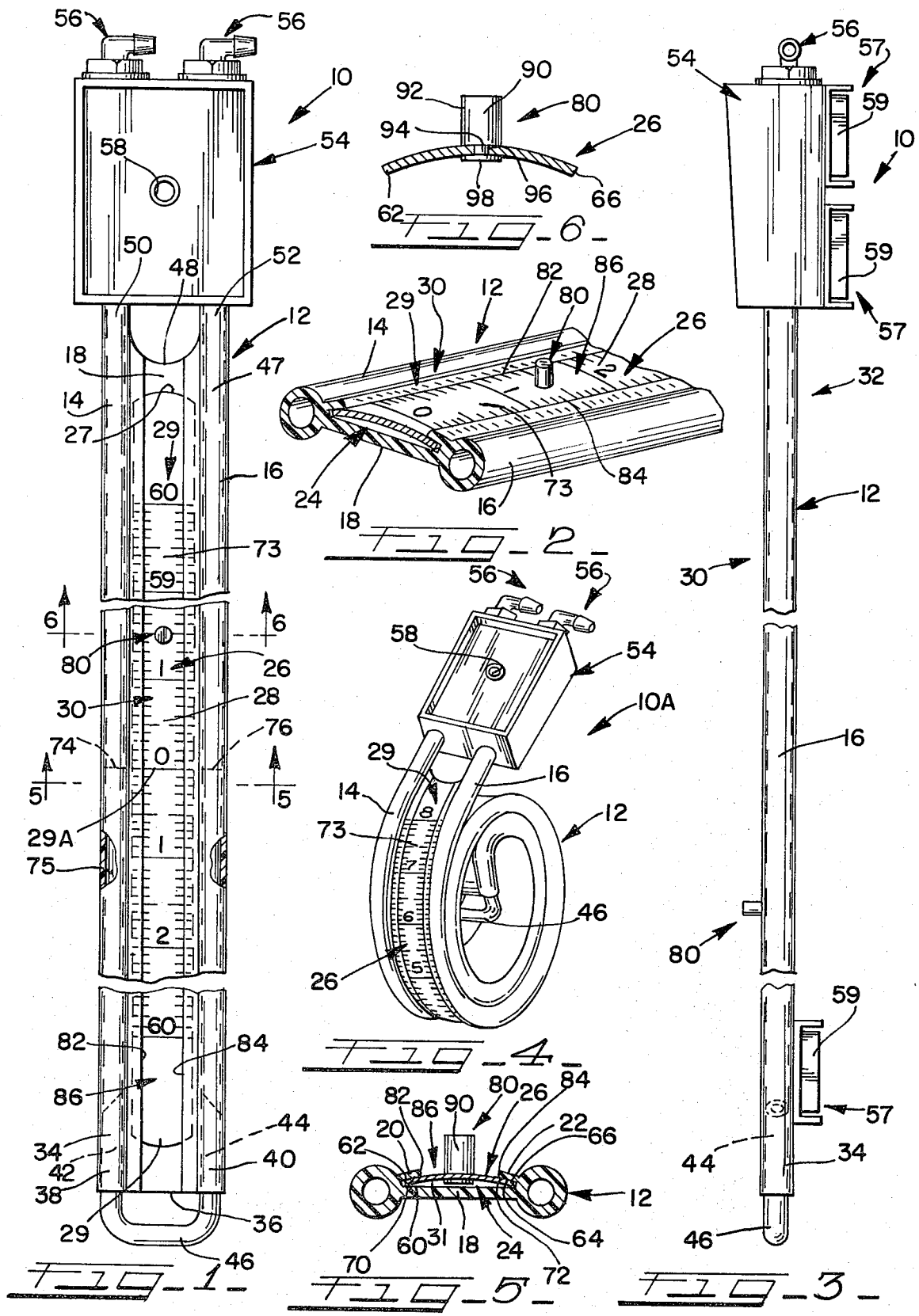

ROLL-UP TYPE U-TUBE MANOMETER

This invention relates to U-tube manometers, and more particularly to the roll-up type manometer that is in the nature of a laboratory U gauge arranged to be rolled up compactly for ease of carrying to test sites, and thus manometers of this type are intended for use primarily outside the laboratory.

James G. Dwyer U.S. Pat. No. 2,662,409, granted Dec. 15, 1953, discloses the original manometer of this type, in which the body of the manometer is formed from a suitable flexible transparent material, preferably by extruding a vinyl resin, to define a pair of elongate tubes connected together by a web that spaces the tubes apart and in parallelism longitudinally of the body. The tubes are connected together at their lower ends by a U-shaped cross tube formed from a suitable relatively rigid plastic material, such as a cellulose acetate butyrate to, in combination with the elongate tubes, form the basic U-tube, and at their upper ends the tubes are arranged for connection to the locales where pressure is to be sensed. In the commercial form represented by Dwyer Instruments Inc. Slack-tube brand manometer, this manometer has the tube body upper end equipped with a molded nylon tubing connector assembly arranged for rapid shut off (see Dwyer Instruments Inc. Bulletin D-40, FIG. 5-3, at page 5, published in 1971).

The manometer body is equipped with a scale that in the arrangement of said Dwyer patent is formed from celluloid or the like, and is threaded through openings formed in the manometer body web, so as to lie between the manometer tubes. As the manometer is to provide for the indicated rolling up for ease of transport and storage, and unrolling for tests and other purposes, the scale must likewise be flexible to permit this, and in addition, this scale must be mounted on the manometer body so as to be adjustable vertically, when the instrument is set up, to permit the needed zero adjust or set in connecting the instrument for use. The U-tube is filled approximately to the half way point with a suitable liquid, such as water containing a suitable dye, or mercury, so that when the instrument is connected up for use, with the necessary zero adjust first having been effected, the differences in the level of the liquid in the two elongate tubes during the test may be read and recorded. Shutting off the U-tube at the indicated connector assembly readies the U-tube for roll up containing the measuring liquid.

In the commercial Slack-tube manometer as illustrated in the above referred to Dwyer bulletin, the scale is in the form of a length of spring steel having its face provided with the usual manometer type indicia, and mounted on the manometer body web by using spaced U-clips, formed from a suitable relatively stiff transparent material such as a butyrate, with the individual clips being stapled to the web in spaced apart relation vertically of the manometer body, that are aligned longitudinally of the manometer body to slidably receive the scale along its side edges.

A special problem involved with gauges of this type is that when the gauge body is rolled up, it is necessary, of course, that the scale be rolled up with it. The scale is a separate element formed from a different material that, while flexible, must not be fixedly connected to the manometer body itself because of the zero adjust requirement. When the body and scale are rolled up and are unrolled, the scale tends to shift relative to the manometer body, requiring that the scale be reset at the vented level of the liquid in the U-tube each time the manometer is set up for use, which is the aforementioned zero adjust. In performing the needed zero adjust, after the instrument is unrolled and set up, but before the instrument is connected to the locale or locales of fluid pressure to the measured manometer style the two elongate tubes are vented, as by appropriate operation of the aforementioned Dwyer connector assembly, and the scale is physically shifted relative to the gauge body to set its zero markers at the level of the liquid in the U-tube. This requires that the operator finger press the ends of the scale in the alternate directions required to exactly set the scale at the zero set level indicated by the U-tube liquid.

Where the scale is of the aforementioned spring steel type, it is an uncomfortable and sometimes painful experience for the operator to have to finger press the relative sharp end edges of the scale to zero set same, as the scale is frictionally retained, by the U-tube body, which friction must be overcome to shift the scale. This is aggravated for the longer manometer models that are commercially available, which may be some ten feet long in unrolled length, even though the scale must be finger pushed its whole length to make the necessary zero adjust. These longer models also present the problem that the operator has to shift his head away from the level of the manometer liquid to reach the scale end, with the result that the zero setting has to be effected in a hit or miss manner without eye contact with the scale zero markers and the gauge zero setting liquid level.

A principal object of the present invention is to arrange the spring steel scale in such a manner that not only will the scale and body uniformly roll up together for transport and/or storage of the instrument, and uniformly unroll, when the instrument is to be set up for use, with minimal shifting of the scale relative to the manometer body, but also the scale is provided with a special finger grip knob for zero setting the scale without loss of eye contact with the scale zero markers and the gauge zero set liquid level regardless of the length of the scale.

Another important object of the invention is to arrange the scale so that the user in performing the zero set procedure, need not finger push the entire length of the scale to shift same relative to the gauge body, but rather pulls one half the scale while pushing the other half, and by way of a conveniently located handle forming implement that makes the needed purchase on the scale.

Another object of the invention is to provide a roll-up type manometer that is economical of manufacture, convenient to store, transport, and set up for use, and that in use has accuracy comparable to the finest laboratory U-gauges.

In accordance with the practice of the invention, the manometer tubes are defined by a flexible body of the type disclosed in said patent, and are formed from a transparent flexible plastic material, such as polyvinyl chloride, that is shaped to define, and preferably by way of extrusion, the basic manometer tubes that are integrally connected in spaced apart relation by the indicated web, which in the preferred embodiment is continuous between the upper and lower ends of the tubes. The flexible body has formed along the front side of same adjacent the juncture of the respective tubes and the web, a pair of continuous opposed flanges that run along either side of the web, and at a similar flat angle relative to same in overlying relation thereto, to define along each tube an apex shaped slot, which slots together with the web form a slideway in which the scale, in the form of the indicated spring steel strip having its face provided with manometer type measuring indicia, is slidably mounted with continuous engagement of the manometer body with the scale along the scale side edges to uniformly hold the scale in its slideway along its length for smooth rolling up of the scale with the body when the manometer is to be transported and/or stored, and roll out when the manometer is to be set up for use.

The slideway defining flanges of the body are integral therewith and provide the sole securement of the scale to the body, by way of static friction. The flanges have their respective projecting edges spaced from each other to define along the slideway an open slot that exposes the central part of the face of the scale. The scale has affixed thereto at a convenient short distance above the scale zero markers a finger grip knob projecting through the slideway slot that permits the operator to perform this zero adjust task without loss of eye contact with the scale zero markers and the gauge zero set liquid level, regardless of the length of the gauge, and to affect the necessary shifting of the scale by way of a convenient push pull action on same, while providing for manual movement of same longitudinally of the body to provide for the required zero adjust that is necessary for devices of this type.

Other objects, uses and advantages will be obvious or become apparent from a consideration of the following detailed description and the application drawings in which:

FIG. 1 is a fragmental front elevational view of a manometer arranged in accordance with the present invention, with parts of the U-Tube broken away to permit the large scale illustration provided;

FIG. 2 is a fragmental perspective view of the manometer tube forming body and the scale mounted in same, in accordance with the practice of the invention;

FIG. 3 is a side elevational view of the manometer as viewed from the right hand side of FIG. 1;

FIG. 4 is a frontal perspective view of a short version of the manometer but shown rolled up for storage and/or transportation to a point of use, indicating one way the gauge can be rolled up for this purpose;

FIG. 5 is a diagrammatic transverse cross-sectional view taken substantially along line 5—5 of FIG. 1, but on an enlarged scale; and FIG. 6 is a diagrammatic transverse cross-sectional view taken substantially along line 6—6 of FIG. 1, but showing only the scale and its associated handle forming knob, and on an enlarged scale.

However, it is to be distinctly understood that the specific drawing illustrations provided are supplied primarily to comply with the requirements of the Patent Laws, and that the invention is susceptible of modification and variations that will be obvious to those skilled in the art, and which are intended to be covered by the appended claims.

Reference numeral 10 of FIGS. 1 and 3 generally indicates a preferred embodiment of the combination invention involved, representing the best mode of practicing the invention, which comprises the manometer body 12 that includes spaced apart tubes 14 and 16 extending longitudinally of the body 12 and spaced apart and integrally united by web 18 that also extends longitudinally of the body 12. The body 12 is preferably arranged substantially in accordance with Buchanan and Phillips application Ser. No. 153,030, filed May 27, 1980, which is assigned to the same Assignee as the present application, as part of the instant combination.

The body 12 also includes spaced apart flanges 20 and 22 that together with the web 18 form a slideway 24 (see FIGS. 2 and 5) that slidably receives flexible scale 26 which bears on its front side 28 scale indicia 29 suitable for manometer guages.

The slideway 24 is formed on the front side 30 of the manometer, with the manometer 10 in use normally being suitably secured in an upright position with the front side 30 facing the user and the back side 32 facing the panel, or other suitable support member on which the manometer 10 is mounted for use.

The body 12 is preferably formed from a suitable transparent plastic material, such as a clear polyvinyl chloride, and is shaped to the configuration indicated in FIGS. 2 and 5 by using a suitable extruding apparatus that forms the resulting extrusion in long lengths that can be later cut to appropriate size in terms of length and the like for the individual bodies 12. At the lower end 34 of the body 12 the body 12 may be trimmed away as desired to define the lower web edge 36, with the lower tube ends 38 and 40 respectively receiving the ends 42 and 44 of cross tube 46. Cross tube 46 may be formed from a relatively rigid transparent plastic material (in accordance with said patent), such as a cellulose acetate butyrate, though, of course, it could be glass. The ends 42 and 44 of cross tube 46 are proportioned to be press fitted into the manometer tube lower ends 38 and 40 so that an effective sealing is provided at this location of the manometer, in accordance with standard practices. Cross tube 46 may also be formed from the same material as body 12, with its ends 42 and 44 being suitably bonded to and in leak free relation to tube ends 38 and 40, respectively, as by employing a suitable glue.

The upper end 47 of the body 12 in the form shown has the web 18 trimmed back to define the upper web margin 48, to leave the upper ends 50 and 52 of the manometer body tubes 14 and 16 projecting from the body 12 for connection to the locales where pressures are to be sensed in using the device 10 in accordance with standard practices. In the illustrated embodiment, the upper ends 50 and 52 of the manometer body tubes 14 and 16 are suitably connected to the diagrammatically illustrated Dwyer over pressure trap assembly 54 that is per se old in the art, and which is illustrated in the aforeidentified bulletin. This assembly also functions as a tubing connector assembly and is characterized by having its tube connectors 56 mounted and arranged so that when rotated counterclockwise to the open position the manometer tube 14 or 16 served by a connector 56 is open, and when rotated clockwise to the closed position, the tube 14 or 16 served by a connector 56 is closed. The assembly 54 is formed with a suitable through aperture 58 for supporting the device 10 from a nail or the like at the point of use. It is also common practice to provide assembly 54 with magnetic clips 57 (see FIG. 3) that each include a magnet 59 for optionally holding the instrument in working position to any upright surface formed from steel or other magnetic material. Clips 57 and their respective magnets 59 are secured in place employing suitable screws (not shown). At the lower end 34 a further magnetic clip 57 including magnet 59 is secured to the body web 18 (as by employing a rivet or the like, not shown) for the same purpose.

Returning now more specifically to the body 12, and in particular, its slideway 24 and the scale member 26 operably mounted therein, it will be observed that the flange 20 along one side of the body web 18 is integral with the tube 14 along the length of the web 18 and overlies the web 18 in flat angled relation thereto to define an apex shaped slot 60 in which one side edge 62 of the scale member 26 is lodged.

Similarly, the flange 22 is integral with the body tube 16 and overlies the front side of the web 18 in flat angled relation thereto to define an apex shaped slot 64 in which the other side edge 66 of the scale member 26 is received. An angulation of the flanges 20 and 22 relative to web 18 of approximately 15 degrees is employed in the illustrated embodiment.

The slots 60 and 64 extend the length of the web 18 in the illustrated embodiment and slidably mount the scale member 26 for manual adjustment movement longitudinally of the body 12 so that the zero adjust provision required for instruments of this type is provided for.

The scale member 26 is formed from spring steel of film dimensions in thickness and physically is comparable to the conventional spring steel measuring tape. Scale member 26 is arced as indicated in FIG. 5 so that its forwardly facing surface 28 is convexly curved transversely of the body 12, with the member 26 being proportioned in dimension between its side edges 62 and 66 so that it will easily fit between the tubes 14 and 16 in close fitting frictional sliding relation thereto, with the arced configuration of the scale member disposing the front surface 28 of the scale member along its longitudinally extending side portions in frictional engagement with the undersides 70 and 72 of the respective body flanges 20 and 22.

The indicia 29 of scale member 26 includes a zero marker 29A at approximately its midlength portion, which in the form shown is a single marker line extending entirely transversely across member 26, with the zero numeral involved being disposed immediately above marker 29A, and with the indicia 29 being subdivided in inches, and the appropriate inch numerals being disposed above each whole inch marker in question. However, scales of the type indicated commonly break the inch marker, including the zero marker 29A, at the center portion 73 of the scale with the appropriate inch marker number being centered on its inch marker and the inch markers thus each being in the form of a pair of spaced apart marker lines aligned transversely of the scale and disposed along the respective side edges 62 and 66 of the scale member 26.

In any event, the U-tube body has a suitable measuring liquid 75 applied thereto, and specifically, to tubes 14 and 16, up to approximately the half way point of the U-tube. When tubes 14 and 16 are both vented through assembly 54 and connectors 56, the liquid, which may be water containing a suitable dye (for ease in reading) or mercury, is at the equal horizontally disposed levels indicated at 74 and 76 of FIG. 1, when the U-tube 10 is vertically disposed. The zero adjust or set procedure that has been referred to involves shifting scale member 26, after setting up the instrument 10, and with tubes 14 and 16 vented through assembly 54 and its connectors 56, so that its zero marker or markers 29A are horizontally aligned with the liquid levels 74 and 76 of tubes 14 and 16, a function that can clearly be best accomplished by the operator having full eye contact with the levels 74 and 76 and the zero marker or markers 29A, and at the operator's "eye level", or the level at which his eyes are level with liquid levels 74 and 76.

Heretofore the operator has been required to shift scale member 26 by using finger pressure at either the upper end edge 27 or the lower end edge 29, of scale member 26, or both, as alternately needed to bring the scale zero marker or markers 29A in horizontal alignment with liquid levels 74 and 76. As scale member 26 is of film dimensions in thickness, this is an uncomfortable, if not a painful experience, because of the sharp nature of scale member edges 27 and 29, and is even more so for the longer versions of U-tube 10, such as the 60-0-60 inch size shown in FIGS. 1 and 3, having in mind that the whole scale member 26 must be finger pressed for pushing it to overcome static friction acting on same for its full length, by reason of the slidable mounting of scale member 26 in slideway 24. Further, for versions of the U-tube exceeding about three feet in length, the operator will have to shift his body downwardly or upwardly to reach the scale member end edges 27 and 29 in question, thus losing the eye contact at the gauge level of levels 74 and 76 that is really needed to avoid making the zero adjust procedure a hit or miss procedure.

Pursuant to the invention, scale member 26 includes finger grip knob 80 that is located adjacent the scale zero marker 29A, and preferably above it, at a position convenient for the operator to grip with one hand while leveling his eyes with the gauge liquid levels 74 and 76 during the zero adjust procedure. The gauge body flanges 20 and 22 define the respective projecting edges 82 and 84 that are spaced apart along body 12 to define an open slot 86 that exposes the central portion 73 of scale member 26, and through which knob 80 extends in projecting outwardly and forwardly of body 12. In the preferred illustrated embodiment, knob 80 is located at the upper one and one-half inch level of scale member 26, as this positions knob 80 relatively close to the mid length portion of scale member 26, but spaces it sufficiently above the scale zero marker 29A to avoid the operator's hand blocking or obscuring of the zero marker 29A and liquid levels 74 and 76 when the zero adjust procedure is preformed.

Knob 80 is a body 90 formed from aluminum or the like to define finger grip cylindrical head portion 92 and stub portion 94, lodged in scale member aperture 96, that is deformed by a suitable riveting operation against the back side 31 of the scale member 26 to form a rivet clinching end 98 that is proportioned to be spaced from body web 18 (see FIG. 5) and thus lie within slideway 24 free of engagement with body 12. It is to be noted that clinching end lies within the arched underside of scale member 26, free of projection beyond the plane of edges 62 and 66. Clinching end 98 has a diameter approximating that of head portion 92 for resisting distortion of the scale member 26 in the area of aperture 96 when knob is being used.

The U-tube 10A of FIG. 4 is the same as U-tube 10, but is shown of shorter length to illustrate conveniently one of its rolled up relations. Its knob 80 is not illustrated as it appears behind the rolled up instrument body. The magnetic clips 57 are not shown in this embodiment.

In assemblying the device 10 or 10A, assuming a body 12 is trimmed to the shaping indicated in FIG. 1, the cross tube 46 is applied to the lower ends of the body tubes 14 and 16, and the upper end of the body 12 is applied to an over pressure trap assembly 54, as desired, or otherwise be arranged for appropriate connection to locales where pressures are to be sensed, such as is suggested by said patent. The scale member 26 may be applied to the body 12 as by slipping same into the body slideway 24 from end 34 of the body, with knob 80 projecting outwardly of slot 86, with the scale member being fed into slideway 24, using knob 80 as a handle, until knob 80 is near the mid length portion of body 12. Scale member 26 may also be applied into body 12 from its end 47 in a similar manner either prior to or after application of body 12 to assembly 54.

To ready a device 10 or 10A for use, an appropriate amount of a suitable liquid (such as mercury, or water containing a suitable dye) is applied to the connector tubes 14 and 16 following conventional practices to bring the liquid levels of the body tubes 14 and 16 to the approximate half way filled levels indicated by levels 74 and 76.

In use, the devices 10 or 10A may be supported from a nail or the like applied to the aperture 58 or have magnetic clips 57 simply applied against a convenient vertical surface defined by magnetic material. The zero adjust procedure is then performed, with tubes 14 and 16 vented through assembly 54 and its connectors 56, which disposes liquid levels 74 and 76 in coplanar horizontal relation, assuming the instrument is vertically disposed, as it will be in normal use. The operator, with his eyes at the level of levels 74 and 76, then grasps in one hand the conveniently located knob 80 and, holding the body 12 stationary with his other hand, shifts scale member 26 up or down, as needed to bring its zero marker 29A into coplanar relation or level with liquid levels 74 and 76. In using knob 80, the operator's pushing action on scale member 26 is confined to about one-half of same, as the other half is being pulled by the same manual thrusting action on knob 80. This has been found to reduce the effort needed to shift scale member 26 relative to body 12, in addition to providing a purchase on the scale member that not only is convenient to effect, but also avoids the operator discomfiture experienced by having to finger press the scale member end edges 27 and 29. Also, the scale members 26 of both short and long U-tubes (which may be ten feet or more in length) can be similarly zero adjusted with equal facility, free of the operator contortions and discomfitures referred to, and without having to lose the all important eye contact with the liquid levels 74 and 76, to effect shifting of scale member 26.

After the zero adjust has been effected, the connectors 56 are suitably connected to the locales where pressures are to be sensed, as by employing suitable tubing and connectors, etc. in accordance with standard practices. If one pressure is to be related to atmospheric pressure, one of the connectors 56 is left unconnected. However, if differential pressures are to be read on the manometer, the two connectors 56 are suitably connected to the locales of the different pressures to be compared. The connectors 56 are moved to their open positions to run the test and are moved to the closed position when the test is completed.

When the device 10 or 10A is to be stored or arranged for transportation, assuming the connectors 56 are in their closed positions, and scale member 26 is roughly centered vertically of body 12, body 12 is rolled up in the manner indicated in FIG. 4, or in the opposite manner with the lower end of the body 12 and its cross tube 46 thus being either rolled up the front side of the body 12, or up the back side of the body 12, into suitable compact relation for storage and/or transportation. Knob 80 is proportioned to project forwardly of body 12 less than a distance corresponding to the external diameter of tubes 14 and 16, and thus protrudes sufficiently from scale member 26 to provide an effective push-pull purchase thereon, without adversely affecting the roll up capability of U-tube 10.

In the arrangement illustrated, it may be noted that the flanges 20 and 22 hold the scale member 26 fully aligned with the body member tubes and web 18 along the length of member 26 as the body 12 is rolled up so that no indentations, projections, or jumping of the scale member relative to the body 12, occur, with the result that the scale member 26 and body 12 uniformly and smoothly are rolled up to their carrying and storing position and similarly unrolled to the substantially rectilinear planar use position indicated in FIG. 1. The scale member 26 is frictionally retained against displacement longitudinally of the body member 12 by the frictional engagement of the body 12 with the scale member 26 at the slots 60 and 64. However, the knob 80 permits the instrument user to readily shift the scale member 26 longitudinally of the slotway 24 as needed to both perform the zero adjust procedure, and remove and replace the scale member 26 for any purpose, such as to substitute a similar scale member 26 having its indicia 29 and 29A arranged in accordance with the metric system.

It will therefore be seen that the invention provides a roll-up type manometer combination in which the flexible body that defines the manometer tubes is of one piece construction arranged to also provide for slidable mounting of the manometer scale in a manner that keeps the scale fully aligned with the body member for stress free rolling up and unrolling of the manometer, and in addition, the need for separate components to secure the scale member to the manometer body is eliminated, as is the problem of anchoring such securing devices to the web of the body. The body as extruded slidably though frictionally receives the scale member from either end of same by way of transparent hold down flanges that extend the length of the body to keep the scale member aligned with its tubes free of indentations and snap action that is characteristic of spring steel measuring tapes. The transparent nature of flanges 20 and 22 insures reading of the scale, and the scale member knob 80 insure a full, comfortable and effective operator purchase on the scale member that is positionally located to retain the all important operator eye contact with the U-tube liquid levels when zero adjust or set is to be effected.

The foregoing description and the drawings are given merely to explain and illustrate the invention and the invention is not to be limited thereto, except insofar as the appended claims are so limited, since those skilled in the art who have the disclosure before them will be able to make modifications and variations therein without departing from the scope of the invention.

I claim:
1. A flexible U-tube manometer of the roll-up type comprising, in combination:
   an elongate flexible body formed from a transparent flexible plastic material and defining a pair of spaced apart tubes extending longitudinally of said body and joined together by a web integrally connecting same that extends substantially the length of said tubes, said web defining a forward facing side surface on the front side of said body and a rearwardly facing side surface on the back side of said body, said body along its front side and adjacent the juncture of the respective tubes and said web defining a pair of continuous flanges, one of said flanges being disposed along one of said tubes and the other of said flanges extending along the other of said tubes, said flanges being in overlying, closely spaced relation relative to said web and each defining a continuous projecting edge portion that parallels said body, with said flange projecting edge portions being spaced apart transversely of said body, said flanges and said web defining therebetween a scale slideway that is open between said flange edge portions, an elongate flexible scale member mounted in said slideway for sliding movement therealong, said scale member comprising a length of spring steel of film thickness dimensions that is arced forwardly of said body web along the length of said scale member, said scale member bearing manometer scale indicia on its forward facing side and defining side edge portions therealong on either side of same that extend longitudinally of said body and that are respectively slidably engaged by the respective flanges, whereby said scale member is frictionally retained in selected zero adjust positions within said scale slideway, said scale indicia including at the midlength portion of said scale a datum zero marker means on each of said scale side portions and aligned transversely of said scale, means for connecting said body tubes at the lower end of said body, means for connecting said tubes at the upper end of said body to locales of fluid pressure to be measured manometer style, said tubes being substantially half filled with fluid pressure measuring liquid manometer style whereby when said manometer is vertically disposed in rectilinear relation and said means for connecting said tubes to the fluid pressure locales is vented for both tubes, the levels of said liquid in said tubes are horizontally aligned, and a knob fixed to said scale member adjacent to said datum zero marker means and projecting forwardly from said scale member forwardly projecting side through and between said flange edge portions, whereby when said levels of said liquid in tubes are horizontally aligned under said vented conditions, said scale member may be moved longitudinally of said slideway by the user of said manometer grasping said knob with one hand and eye leveling said scale member datum zero marker means with said horizontally aligned tubes liquid levels to zero set said manometer free of finger pressure application to said scale member at the ends of same.

2. The manometer combination as set forth in claim 1 wherein:

said knob is above said datum zero marker means.

3. The manometer combination set forth in claim 2 wherein:

said knob is a one piece metallic member riveted to said scale member with a stub portion thereof extending through said scale member and clinched thereagainst on the rearwardly facing side for spacing said clinching portion thereof from said web.

4. The manometer combination set forth in claim 2 wherein:

said body and said scale member are proportioned lengthwise of said manometer to have an operating range that is at least thirty-six inches.

5. The manometer combination set forth in claim 2 wherein:

said knob is approximately one and one-half inches above said zero marker means.

* * * * *